United States Patent

Johnson

[15] 3,676,605

[45] July 11, 1972

[54] SPIKE MONITORING APPARATUS

[72] Inventor: James W. Johnson, Culver City, Calif.

[73] Assignee: Telephonic Equipment Corporation, Arcadia, Calif.

[22] Filed: March 18, 1969

[21] Appl. No.: 808,087

[52] U.S. Cl. ....................179/18 BE

[51] Int. Cl. ....................H04m 3/54

[58] Field of Search..............179/1 MN, 18.03, 18.3 A, 18.3, 179/89, 16.2, 5.5, 6 AC, 6 CO, 18 BE, 18 BD, 16 H

[56] References Cited

UNITED STATES PATENTS

| | | | |
|---|---|---|---|
| 3,156,778 | 11/1964 | Cirone | 179/18.3 A |
| 3,172,958 | 3/1965 | Williford | 179/18.3 A |
| 3,301,961 | 1/1967 | Odom | 179/18.03 |
| 3,321,583 | 5/1967 | Maul | 179/18.3 A |
| 3,409,741 | 11/1968 | Odom | 179/18 BE |
| 3,542,964 | 11/1970 | Odom | 179/18 BE |

*Primary Examiner*—Kathleen H. Claffy
*Assistant Examiner*—Randall P. Myers
*Attorney*—Sellers and Brace

[57] ABSTRACT

Monitoring apparatus for an electrical circuit, as a telephone circuit, operable to discriminate between various signals and a particular signal different from any thereof and for utilizing the detection of the particular signal to perform a useful function. By way of example, the monitor is useful to discriminate between the various normal signals typically involved in the operation of telephone circuitry and the "on hook" and "off hook" signal inherently generated as an incident to reseating or removing the handpiece relative to its cradle. The resulting spike signal, even though of micro-second duration, is detected and utilized to trigger a circuit effective to disengage automatically central station equipment essential to the operation of the circuit and making it available for immediate use by other telephone subscribers. The monitoring apparatus, conventionally located with the equipment to be released, operates to arm itself automatically as an incident to the establishment of a telephone circuit and includes means for restoring the components to their initial condition automatically in response to opening an established telephone circuit at any terminal thereof.

8 Claims, 1 Drawing Figure

PATENTED JUL 11 1972
3,676,605
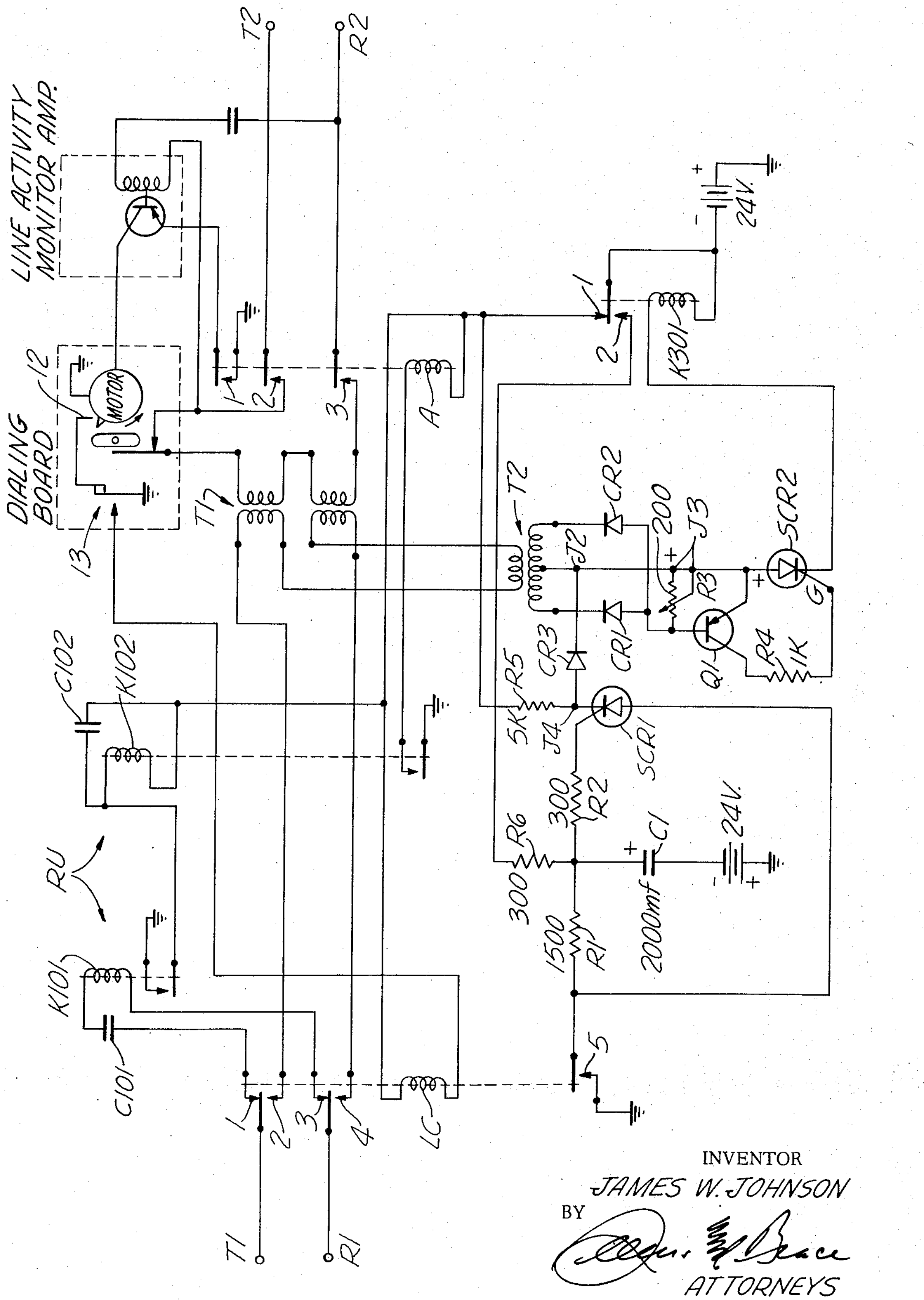
INVENTOR
JAMES W. JOHNSON
BY
ATTORNEYS

SPIKE MONITORING APPARATUS

This invention relates to monitoring apparatus and more particularly to an improved and unique apparatus for monitoring an electric circuit for the presence therein of a particular signal having characteristics distinctive from other signals normally present in the circuit and effective upon the detection of the particular signal to operate a control circuit.

Typical of the many uses to which the present invention can be applied is to a communication circuit between remotely located stations and involving the use of intermediate central station equipment maintained in a standby condition and available upon demand to complete any of various communication circuits. Such central station equipment is both complex and costly, and it is of critical importance from a maintenance and economic point of view that a minimum amount of this standby equipment be provided and that it be made available for use immediately that a prior period of service has been concluded. These objectives would be served by releasing the equipment immediately that an established telephone circuit goes out of use. However, heretofore, there has been provided no fully satisfactory and foolproof means for this purpose.

It is a common expedient to employ signal lamps or the like at the central station visible to operators who, upon observing a lamp indicating that any party has hung up, performs manual operations to release the central station equipment and to restore it to the standby pool of available equipment.

With the advent of automatic dialing and the like equipment for completing calls without human intervention, there has been an unsatisfied need for reliable automatic equipment for releasing central station and the like parent equipment and suitable for connection to existing equipment with minimum changes and which will not cause non- or malfunctioning of the existing equipment and operating to release certain equipment instantly that any party discontinues use of the telephone.

As a further example of a need not satisfied by previously proposed equipment and served by the present invention is the growing and wide-spread use of telephone circuitry to request service information from a central storage bank. Illustrative of such services are the storage banks in current use to provide weather information, stock quotations, customer credit information, computer services, and many others. Once the requested information has been provided by a full operating cycle of the storage bank equipment there no longer is need for retaining the central station telephone equipment in service on that telephone circuit and it should be released to standby irrespective of whether the caller hangs up. By the use of such means, both the storage facility and the central station equipment may be utilized to a maximum without in any way curtailing the usefulness of the service to the customer.

To meet the foregoing and other shortcomings and disadvantages of monitoring equipment heretofore provided, there is provided by the present invention simple, rugged, positively-acting circuitry readily incorporated in existing electric circuits without diminishing the utility or reliability thereof. The detection components include high-sensitively solid state means readily adjustable and effective to discriminate between various types of signals typically present in the circuit being monitored and a particular signal indicative of the conclusion of an operating cycle or period of use. The detection of this particular signal is utilized to trigger fast action switch means to effect release of unneeded equipment for use in other circuits upon demand. Specifically, the fast action switch means utilized in an exemplary embodiment of the invention comprises transistor means normally held against conduction as respects signals normally present in the circuit being monitored. Upon becoming conductive this transistor means activates a control circuit and more specifically means for releasing the unneeded equipment and restoring the monitoring circuitry to its initial inactive status. Additional embellishments which may be employed include circuitry for isolating the sensitive detector means from certain signals commonly passing over the line and useful in establishing the circuit initially. Such signals could possibly lead to premature release of the equipment. Accordingly, and since there is no need for activating the monitoring cycle prior to completion of the communication circuit, it is desirable to utilize means for isolating and monitoring function until the circuit has been fully established. The monitoring circuitry also includes means for normally deactivating the monitoring components and the power supply thereto until and unless there is a demand for its use.

Accordingly, it is a primary object of the present invention to provide unique, high-sensitivity, high-reliability apparatus for monitoring an electrical circuit for the presence therein of a particular signal differing significantly from various other signals customarily present therein.

Another object of the invention is the provision of electrical signal discriminator means unaffected by various signals but instantly responsive to a significantly different signal to perform a desired operation.

Another object of the invention is the provision of monitoring apparatus readily connected with conventional circuitry utilizing standby components upon demand and automatically responsive to a signal indicative of the end of an operating cycle to release these components to standby status and in readiness for reuse.

Another object of the invention is the provision of monitoring equipment for use with telephone circuitry and featuring high-sensitivity detector means conditioned to correspond to normal telephone operating signals but instantly and automatically responsive to a distinctive signal indicative of the end of an operating period to deactivate the equipment and to remove battery therefrom.

Another object of the invention is the provision of monitoring equipment for use with telephone circuitry armed automatically as an incident to completing a called circuit and then effective to monitor the circuit for a distinctive signal characteristic of hang up at any terminal and functioning to deactivate the entire circuit automatically and without need for supervision or any manual act.

Another object of the invention is the provision of telephone circuitry utilizing automatic switching equipment responsive to dialing signals to complete a circuit to a called station and for arming the monitoring apparatus to detect discontinuance of use of the circuit.

These and other more specific objects will appear upon reading the following specification and claims and upon considering in connection therewith the attached drawing to which they relate.

Referring now to the drawing in which a preferred embodiment of the invention is illustrated:

The single schematic view of the drawing illustrates one preferred embodiment of the invention monitoring apparatus connected to a typical electrical circuit utilized to complete an operating circuit to a party being called.

Referring to the schematic, there is shown by way of illustration typical components of a dial-controlled telephone circuit having an incoming line represented at T1, R1 and an outgoing line T2, R2. It will be understood that these two lines may terminate at remotely spaced locations forming part of a conventional telephone system utilizing dialing devices for generating pulses effective to operate line selector switch gear. Such equipment is normally located at a central station or other common junction point for several incoming and outgoing lines. The monitoring equipment normally held in standby status and available for use in completing a telephone circuit over this conventional telephone system includes a ringing unit designated RU, line selector mechanism herein designated "dialing board," a line activity monitor amplifier, a line control relay LC for the incoming line, a line relay A for the outgoing line and an acoustical coupling coil or transformer T1. The signal monitoring equipment provided by this invention includes relay controlling, the power supply for the circuitry, and solid state components herein shown connected with coupling coil T1 and coupling coil T2.

The signal monitoring components feature a fast-action switch comprising a transistor Q1 having its base connected to the opposite ends of the secondary of transformer T2 through diodes CR1 and CR2. The secondary of T2 has a center tap connected to the anode of a silicon controlled rectifier SCR2 having its cathode connected to the coil of relay K301 and to the positive of a 24-volt battery. The magnitude of the positive bias or threshold maintained on the base of Q1 is controlled by the variable voltage divider R3, one end of this potentiometer being connected to the base of Q1 and the other end to J3. Likewise the emitter of Q1 is connected to J3 and to the anode of SCR2, whereas the collector of Q1 is connected to the gate of SCR2 through resistor R4.

Desirably the fast-action switch circuitry is isolated from the possibly adverse effects of ringing signals present in the telephone circuit proper during processing of the dialing signals. Isolation circuitry suitable for this purpose is shown to the left of transformer T2 and includes the resistors R1, R2, R5, R6, capacitor C1, a 24-volt battery supply, silicon controlled rectifier SCR1 and diode CR3 connected as shown. These components also function to arm the monitoring circuit and condition it to detect the particular spike signal in the telephone circuit for which the threshold control adjustment R3 has been set.

OPERATION

The described monitoring apparatus shown in the schematic functions as follows:

Let it be assumed that a subscriber at the terminal or station end of the incoming line removes the handpiece from the cradle and operates the conventional dial of his telephone set as required to obtain a connection with the incoming line T1, R1. At this time, line control relay LC will be de-energized and its contacts will be in the position shown with contacts 1 and 3 closed thereby completing a circuit through ringing unit relay RU. Each pulse of the dialing signal operates to close the contact of relay K101 momentarily thereby completing an energizing circuit through pulsing relay K102 by way of the closed contact of relay K101, closed contact 1 of relay K301 and the 24-volt battery in the lower right-hand corner of the schematic, thereby energizing line control relay A of the outgoing or called line T2, R2. The energization of relay A closes its contacts 1, 2 and 3, thereby activating the line-activity monitor amplifier as well as the line selector equipment associated with the dialing board. The drive motor of that equipment is pulsed counterclockwise one complete revolution in processing the dialing signal. At this time the triangular shaped cam, shown in the 10 o'clock position of the pulsing motor, contacts cam follower 12 and closes switch 13 momentarily to complete a power circuit to line control relay LC, closing its contacts 2, 4 and 5 and opening its contacts 1 and 3.

Closed contacts 2 and 4 of the LC relay (1) complete a communication circuit from the calling station to the called station by way of the acoustical coupling transformer T1, (2) the opening of contacts 1 and 3 deactivates the ring-up circuit of the RU relay and, (3) closing contact 5 completes a power circuit to the time delay and arming circuit for the fast-action switch Q1. Initially the power supply provided by the battery underlying capacitor C1 passes through the LC relay contact 5 and resistance R1. Owing to the size of this resistance and the fact that C1 is initially fully discharged, the charge on this capacitor rises slowly. When C1 reaches some percentage of its full charge, as 75 percent, the potential drop across resistance R2 is sufficiently high to trigger SCR1 into conduction thereby applying a positive ground potential via diode CR3 to junction J2 and to the center tap of the secondary of T2. This same standing positive ground is also applied to junction J3 and to the anode of the silicon controlled rectifier SCR2 as well as to the emitter of transistor Q1. Owing to the presence and size of the artificial load resistor R5 the positive potential at, junction J4 is greater than the potential provided from the 24 volt battery; likewise junctions J2 and J3 are positive. The setting of the control of potentiometer R3 will therefore be understood as determining the size of the negative going potential obtained by a current flow through its left-hand end and through the secondary of T2 to counter the standing positive potential and trigger Q1 into conduction.

The entire circuit is now active and the monitoring equipment is fully armed and in instant readiness to detect the presence in the completed telephone circuit of a cycle completion signal. Typically, and in the equipment here described, this signal occurs as the party at either end of the established communication line hangs up his receiver thereby opening that terminal end of the circuit. Immediately this occurs a sharp spike of micro-second duration appears at transformer T1 characteristic of the sudden collapse of the charge on the line and in the energized components. If termination occurs in the outgoing circuit, this spike is sensed by the other side of T1 in inverted phase and is sensed with its phase again inverted in the secondary of T2. As will be readily apparent, if the characteristic hang-up spike signal occurs from the left-hand or calling end of the line, then it is inverted only once, that is at transformer T2. However, the split construction of the secondary and the use of the diodes in each side thereof assures that only the negative going signal is sensed by the base of Q1 where it is effective to trigger this transistor into conduction. A conduction path established through Q1 fires SCR2 and energizes relay K301. Energization of this relay removes the power supply from its now open contact 1, thereby de-energizing line control relay A and disconnecting the central station equipment from the called line. Additionally and simultaneously, line control relay LC is de-energized restoring the contacts of this relay to their original condition and opening the arming circuit to the monitoring equipment. Under these conditions, the charge on the time delay capacitor C1 leaks off through the resistors.

It is therefore apparent from the foregoing that the entire circuit is now de-energized with all power circuits open and all components restored to their original condition and available in standby condition for use in servicing the next demand for a communication circuit.

It remains to be pointed out that the invention monitoring equipment may be used in various circuits other than that specifically disclosed herein. Even the present schematic may be varied widely without departing from the principles of this invention. For example, if the equipment is being used to monitor stored information or information provided by a computer attached to one terminal of the line, then in that event the line activity monitoring amplifier, the dialing switch gear relay K102 and line control relay A can be omitted and the storage servicing equipment connected directly to the outer terminals of coupling transformer T1. It will be understood that the service equipment is effective in the same manner described above to open the line at the called end as soon as the service cycle is completed. The termination of this service cycle then provides the spike signal effective to activate the invention monitoring apparatus and the latter functions as described above to release and deactivate the monitoring equipment including the removal of the power supply therefrom until the equipment is again called upon for a monitoring operation.

While the particular monitoring apparatus herein shown and disclosed in detail is fully capable to attaining the objects and providing the advantages hereinbefore stated, it is to be understood that it is merely illustrative of the presently preferred embodiments of the invention and that no limitations are intended to the detail of construction or design herein shown other than as defined in the appended claims.

I claim:

1. That improvement in apparatus for monitoring a communication circuit between first and second stations and including switch gear operable to connect said first and second stations only when there is need for transmitting intelligence therebetween, said communication circuit being of the type coupled together by acoustical coil coupling means having a normally grounded center tap and including normally open first and second relay means having contacts in the communication circuit on either side of said coupling means, and said switch gear including means for processing ringing and the like service signals along said communication circuit, said improvement comprising: means for monitoring said communication circuit so long as one of said first and second relays is activated for the appearance therein of a spike signal of micro-second duration occurring upon the release of said communication circuit at the associated end of said first or second stations and responsive to said spike signal to de-energize said one relay means, said monitoring means including fast action switch means, adjustable threshold means for distinguishing intelligence and service signals in this communication circuit from said micro-second spike signal and effective to bias said fast action switch means to its inactive open position for all intelligence and communication circuit service signals having a potential below a predetermined potential, diode means connected between the opposite ends of said acoustical coil coupling means and said fast action switch means biased against response to said intelligence signals and said communication circuit service signals, and said fast action switch means being triggered in response to the appearance of said micro-second spike signal originating from either said first or said second station to deactivate any activated one of said first and second relays.

2. That improvement defined in claim 1 characterized in the provision of means for maintaining said relays deactivated for a minimum interval after restoring an active circuit between either of said first and second stations and effective to delay closing said relays during the transmission of ringing signals between the calling station and said central station.

3. That improvement defined in claim 1 characterized in that said means for deactivating any activated one of said first and second relays operates automatically and without human intervention following the appearance in said communication circuit of said spike signal thereby to release said central station equipment for use with another communication circuit.

4. That improvement defined in claim 1 characterized in the provision of circuit means operatively connected with said monitoring means and effective to restore said first and second relay means to the initial condition thereof automatically as an incident to the detection of a spike signal when either end of said communication circuit is opened at the end of a period of use.

5. That improvement defined in claim 1 characterized in that said means for distinguishing intelligence and service signals from said spike signals includes arming circuit means to detect said spike signal and including time delay means for rendering said arming circuit means effective in time delay sequence of adequate duration for completion of the ringing and service signals for the called station thereby to isolate said monitoring means from the latter signals during the ringing and answering period.

6. Telephone circuitry for controlling the use of telephone signal-operated switching equipment and for monitoring an operating telephone circuit via said switching equipment to detect a spike signal produced as an incident to releasing either station of the telephone circuit after a period of use, said circuitry having switching station means provided with at least one incoming and one outgoing line means adapted to be operatively connected to one another by acoustical coupling means, spike detector means comprising means including transistor means normally biased against conduction by the normal telephone operating signals, adjustable means for varying the normal bias effective to prevent conduction of said transistor means and operable to set the bias at a level rendering said transistor means immune to signals normally passing over said circuit but ineffective to interfere with the operation of said spike signal responsive means, means for utilizing a spike signal produced when releasing any station of a completed telephone circuit to counteract the normal bias on said transistor means and effective to trigger said transistor means, and means including circuit means responsive to the triggering of said transistor means to automatically disengage said switching equipment and restore the same to a standby condition.

7. Telephone circuitry as defined in claim 6 characterized in that said circuit means responsive to the triggering of said transistor means includes control relay means connected to one of said incoming and outgoing line means and having normally open contacts connected in circuit with said coupling means, said control means also including a normally open starting ground contact in circuit with time delay means for arming said spike detector means a predetermined period after said control relay means is energized, and means for energizing said control relay means in response to completion of a dial-controlled switching cycle.

8. Telephone circuitry as defined in claim 7 characterized in the provision of means for restoring said time delay means to the initial condition thereof in readiness for the next timing cycle.

* * * * *